UNITED STATES PATENT OFFICE.

ALLERTON S. CUSHMAN, OF WASHINGTON, DISTRICT OF COLUMBIA.

METHOD OF TREATING ROCKS CONTAINING POTASSIUM.

987,436.  Specification of Letters Patent.  Patented Mar. 21, 1911.

No Drawing.  Application filed December 17, 1910.  Serial No. 597,818.

*To all whom it may concern:*

Be it known that I, ALLERTON S. CUSHMAN, a citizen of the United States, residing at Washington, in the District of Columbia, have invented certain new and useful Improvements in Methods of Treating Rocks Containing Potassium, of which the following is a specification.

The object of this invention is the provision of an economical method whereby the potassium content of certain minerals or rocks may be converted, partly or wholly, into a water-soluble state.

The invention will be described as applied to the treatment of feldspathic rocks or minerals, which may be regarded for the purposes of this specification as consisting essentially of silicate of potassium and aluminum.

Many efforts have heretofore been made to transform the potassium contained in orthoclase and similar minerals into a water-soluble condition, but in no case, so far as I am aware, have such efforts been commercially successful. The reaction itself whereby the feldspars are decomposed in presence of lime, or of lime and sodium chlorid, presents no particular difficulties on a laboratory scale and at a fusing temperature, but has heretofore proven quite impracticable from a commercial point of view. I have now discovered that it is possible to transform a commercially important quantity of the potassium contained in feldspars and other potassium-bearing rocks into a water-soluble condition, under conditions which render possible the economical and continuous treatment of large quantities of material.

As a specific example of my invention I may proceed as follows: The feldspar or feldspathic rock is first reduced to as fine subdivision as is practicable, preferably to pass through a screen having two hundred meshes to the linear inch. This finely powdered material is then uniformly mixed with a suitable proportion of finely pulverized quicklime. Suitable proportions for the mixture comprise 100 parts of ground feldspar to 20 parts of lime, although the proportion of lime may be varied within wide limits, inasmuch as its principal function is related to the production of aggregates as hereinafter described. Under certain conditions, and particularly when the subsequent furnacing is carried out under conditions not requiring the production of extremely hard aggregates, the lime may be entirely omitted. This pulverulent mixture is then uniformly spread upon a suitable conveyer, as a belt or drum, in the form of a bed having a thickness of three-eighths to one-half inch or somewhat more. To the surface of this bed is now applied a solution of calcium chlorid, care being preferably observed that the solution is applied in separate drops, so positioned with relation to each other that the aggregates formed shall not merge or unite into a solid mass or crust. The calcium chlorid reacts immediately with the lime to form an oxychlorid cement by which that portion of the powder with which the calcium chlorid solution comes in contact is "clumped" or collected into small rounded masses or aggregates which harden quickly at ordinary temperatures. These aggregates are separated from the unconverted powder by screening, and after drying or even without the necessity of drying, are further heated to a proper reacting temperature. Similar aggregates are formed in the absence of lime, but less hard and strong than those prepared as above.

The reaction may take place at a dull red heat, and the temperature is preferably but not necessarily kept below the point at which a substantial portion of the potassium chlorid formed is sublimed. The furnacing of the aggregates is best carried out in a rotary furnace or kiln, which may be of the type used for the burning of cement or like materials. The rounded masses progress regularly and uniformly through the kiln, and during their progress and without fusing or fritting, a reaction occurs whereby a substantial proportion of the potassium content of the feldspar is converted into a chlorid, with simultaneous formation of a silicate of calcium. The product is discharged from the furnace in the form of small lumps or particles, and may be crushed or ground for use as a fertilizer or as a component of mixed fertilizers; or the potassium chlorid may be extracted by means of water and recovered from the solution or utilized therein in any preferred way. The freshly prepared product contains a proportion of free lime which is in general approximately the same as the free lime in the mixture before calcination.

The amount and concentration of the calcium chlorid solutions are determined by reference to certain factors: The amount of calcium chlorid added should be sufficient to supply chlorin in quantities at least molecularly equivalent to the total alkali contained in that portion of the feldspar which is aggregated into lumps; and the concentration of the calcium chlorid solution should be such that calcium chlorid and water are contained therein in proper proportions to form with the lime associated with the feldspar an oxychlorid cement of proper character, say for example a cement containing lime, calcium chlorid and water in the approximate proportions represented by the formula $$3CaO.CaCl_2.15H_2O.$$

For example, 100 parts of feldspar containing 11.5% of $K_2O$ would require approximately 13.6 parts by weight of calcium chlorid to supply the chlorin necessary for the formation of KCl. These 13.6 parts of calcium chlorid, or preferably an amount in some excess thereof, are added in solution in 28.6 parts by weight of water, the solution being added preferably drop by drop, to an excess of a pulverized mixture of feldspar and lime in proportions of 100 : 20. The above illustrative conditions may be widely varied, it being necessary only that the chlorin should be supplied in sufficient proportion as demanded by the reaction, and that the lumps or aggregates formed should be of such character as to endure, without breaking down into an ultimate powder, the operations involved in their separation and furnacing. The calcium chlorid may be supplemented or in part replaced by any other suitable alkali or alkali-earth metal chlorid; or it may be replaced under certain conditions by salts of other mineral acids capable of decomposing mineral silicates of the character above described, as for example by an alkali metal sulfate.

I do not claim broadly the above described method of preparing pulverulent charges for furnacing, and it should be understood that the aggregate may be prepared for furnacing by methods other than that herein described, as for example by the use of pressure applied to a suitable mixture, the resulting masses or briquets being thereafter broken or crushed to suitable size for furnacing.

I claim:—

1. The method of treating feldspathic or similar rock for the purpose of converting potassium contained therein into a water-soluble state, which consists in powdering the rock, forming therefrom aggregates containing a salt of a mineral acid capable of decomposing such rock, and furnacing such aggregates.

2. The method of treating feldspathic or similar rock for the purpose of converting potassium contained therein into a water-soluble state, which consists in powdering the rock, forming therefrom aggregates containing a salt of a mineral acid capable of decomposing such rock, and furnacing such aggregates while in motion.

3. The method of treating feldspathic or similar rock for the purpose of converting potassium contained therein into a water-soluble state, which consists in powdering the rock, forming therefrom aggregates containing a suitable chlorid, and furnacing such aggregates.

4. The method of treating feldspathic or similar rock for the purpose of converting potassium contained therein into a water-soluble state, which consists in powdering the rock, forming aggregates therefrom by the action of calcium chlorid, and furnacing such aggregates.

5. The method of treating feldspathic or similar rock for the purpose of converting potassium contained therein into a water-soluble state, which consists in powdering the rock, forming aggregates therefrom by the action of calcium chlorid in presence of lime, and furnacing such aggregates.

6. The method of treating feldspathic or similar rock for the purpose of converting potassium contained therein into a water-soluble state, which consists in powdering the rock, treating the powdered material with a solution of calcium chlorid, thereby forming lumps or aggregates, and furnacing such aggregates.

7. The method of treating feldspathic or similar rock for the purpose of converting potassium contained therein into a water-soluble state, which consists in powdering the rock, treating the powdered material with a solution of calcium chlorid, thereby forming lumps or aggregates associated with residual powdered material, and furnacing the aggregates.

8. The method of treating feldspathic or similar rock for the purpose of converting potassium contained therein into a water-soluble state, which consists in powdering the rock, mixing a proportion of lime therewith, treating the powdered mixture with a solution of calcium chlorid and thereby forming aggregates associated with powdered material, separating such aggregates from the powdered material, and furnacing the aggregates.

In testimony whereof, I affix my signature in presence of two witnesses.

ALLERTON S. CUSHMAN.

Witnesses:
GEORGE W. COGGESHALL,
CLINTON P. TOWNSEND.